US00RE47143E

(19) United States
(12) Reissued Patent
Mevissen et al.

(10) Patent Number: US RE47,143 E
(45) Date of Reissued Patent: Nov. 27, 2018

(54) DECOUPLER ASSEMBLY

(71) Applicant: LITENS AUTOMOTIVE PARTNERSHIP, Woodbridge, ON (CA)

(72) Inventors: Pierre A. Mevissen, King City (CA); Warren J. Williams, Oakville (CA)

(73) Assignee: LITENS AUTOMOTIVE PARTNERSHIP, Woodbridge, Ontario (CA)

(21) Appl. No.: 15/806,949

(22) Filed: Nov. 8, 2017

Related U.S. Patent Documents

Reissue of:
(64) Patent No.: 9,181,989
Issued: Nov. 10, 2015
Appl. No.: 14/237,524
PCT Filed: Aug. 8, 2012
PCT No.: PCT/CA2012/000741
§ 371 (c)(1),
(2) Date: Jul. 16, 2014
PCT Pub. No.: WO2013/131166
PCT Pub. Date: Sep. 12, 2013

U.S. Applications:
(60) Provisional application No. 61/521,205, filed on Aug. 8, 2011.

(51) Int. Cl.
*F16D 3/00* (2006.01)
*F16H 59/00* (2006.01)
(Continued)

(52) U.S. Cl.
CPC ..... *F16D 13/12* (2013.01); *F02B 67/06* (2013.01); *F16D 41/206* (2013.01); *F16H 55/36* (2013.01)

(58) Field of Classification Search
CPC . F16D 3/00; F16D 13/12; F16D 41/20; F16H 55/14; F16H 55/36; F16H 9/00;
(Continued)

(56) References Cited

U.S. PATENT DOCUMENTS 2,534,033 A 12/1950 La Brie
2,885,896 A * 5/1959 Hungerford, Jr. et al. ..... 474/70
(Continued)

FOREIGN PATENT DOCUMENTS

CN 1668859 A 9/2005
DE 102007047393 A1 4/2008
(Continued)

OTHER PUBLICATIONS

PCT/CA2012/000741, Search Report, dated Dec. 3, 2012; 3 pages.
(Continued)

*Primary Examiner* — Sara S Clarke
(74) *Attorney, Agent, or Firm* — Howard & Howard Attorneys PLLC

(57) ABSTRACT

A decoupler assembly that includes a hub, a pulley and a mechanism for transmitting rotary power between the hub and the pulley. The mechanism includes a torsion spring and a one-way clutch. The torsion spring is configured to dampen vibration in the rotary power that is transmitted from the pulley to the hub. The one-way clutch has a wrap spring that is smaller in diameter than the torsion spring.

21 Claims, 5 Drawing Sheets

(51) Int. Cl.

| | |
|---|---|
| ***F16H 9/00*** | (2006.01) |
| ***F16H 55/36*** | (2006.01) |
| ***F16H 55/14*** | (2006.01) |
| ***F16H 61/00*** | (2006.01) |
| ***F16D 41/20*** | (2006.01) |
| ***F02B 67/06*** | (2006.01) |
| ***F16D 13/12*** | (2006.01) |
| ***F16H 63/00*** | (2006.01) |

(58) Field of Classification Search
CPC ..... F16H 59/00; F16H 61/00; F16H 63/00; F02B 67/06
See application file for complete search history.

(56) References Cited

U.S. PATENT DOCUMENTS

| | | | | |
|---|---|---|---|---|
| 3,528,533 | A * | 9/1970 | Sacchini | 192/41 S |
| 3,893,554 | A * | 7/1975 | Wason | 464/40 |
| 4,273,547 | A * | 6/1981 | Bytzek | 474/170 |
| 4,460,076 | A * | 7/1984 | Yamada | 192/35 |
| 5,139,463 | A | 8/1992 | Bytzek et al. | |
| 5,156,573 | A | 10/1992 | Bytzek et al. | |
| 5,598,913 | A * | 2/1997 | Monahan et al. | 192/41 S |
| 5,665,018 | A | 9/1997 | Miyata | |
| 5,722,909 | A | 3/1998 | Thomey | |
| 6,044,943 | A * | 4/2000 | Bytzek et al. | 192/41 R |
| 6,083,130 | A * | 7/2000 | Mevissen et al. | 474/70 |
| 6,394,247 | B1 * | 5/2002 | Monahan et al. | 192/41 S |
| 6,394,248 | B1 | 5/2002 | Monahan et al. | |
| 6,659,248 | B2 | 12/2003 | Terada | |
| 6,691,846 | B2 * | 2/2004 | Titus et al. | 192/41 S |
| 6,955,141 | B2 | 10/2005 | Santanam et al. | |
| 7,070,033 | B2 * | 7/2006 | Jansen et al. | 192/41 S |
| 7,153,227 | B2 * | 12/2006 | Dell et al. | 474/70 |
| 7,207,910 | B2 | 4/2007 | Dell et al. | |
| 7,275,630 | B2 * | 10/2007 | Jansen et al. | 192/110 R |
| 7,507,172 | B2 * | 3/2009 | Lehtovaara et al. | 474/109 |
| 7,591,357 | B2 * | 9/2009 | Antchak et al. | 192/55.5 |
| 7,618,337 | B2 * | 11/2009 | Jansen et al. | 474/74 |
| 7,712,592 | B2 * | 5/2010 | Jansen et al. | 192/41 S |
| 7,766,774 | B2 * | 8/2010 | Antchak et al. | 474/74 |
| 7,975,821 | B2 * | 7/2011 | Antchak et al. | 192/55.1 |
| 8,006,819 | B2 | 8/2011 | Dell et al. | |
| 8,021,253 | B2 | 9/2011 | Dell et al. | |
| 8,047,920 | B2 * | 11/2011 | Jansen et al. | 464/60 |
| 8,132,657 | B2 * | 3/2012 | Antchak et al. | 192/55.1 |
| 8,177,669 | B2 * | 5/2012 | Ishida et al. | 474/94 |
| 8,302,753 | B2 * | 11/2012 | Antchak et al. | 192/55.5 |
| 8,485,331 | B2 | 7/2013 | Parsons et al. | |
| 8,534,438 | B2 * | 9/2013 | Antchak et al. | 192/55.5 |
| 8,678,157 | B2 * | 3/2014 | Ward et al. | 192/55.1 |
| 8,813,928 | B2 * | 8/2014 | Schneider et al. | 192/41 S |
| 8,813,932 | B2 * | 8/2014 | Ward et al. | 195/55.5 |
| RE45,156 | E * | 9/2014 | Jansen et al. | 464/60 |
| 8,820,503 | B2 * | 9/2014 | Schneider et al. | 192/55.5 |
| 8,888,619 | B2 * | 11/2014 | Antchak et al. | 474/74 |
| 8,931,610 | B2 * | 1/2015 | Serkh | 192/55.5 |
| 8,985,293 | B2 * | 3/2015 | Marion et al. | 192/55.5 |
| 9,033,832 | B1 * | 5/2015 | Serkh et al. | 474/70 |
| 9,181,989 | B2 | 11/2015 | Mevissen et al. | |
| 2003/0098214 | A1 * | 5/2003 | Titus et al. | 192/41 S |
| 2004/0014540 | A1 * | 1/2004 | Dell et al. | 474/70 |
| 2004/0104090 | A1 * | 6/2004 | Jansen et al. | 192/41 S |
| 2006/0144664 | A1 | 7/2006 | Antchak et al. | |
| 2006/0148581 | A1 * | 7/2006 | Jansen et al. | 464/61.1 |
| 2007/0037644 | A1 | 2/2007 | Mevissen et al. | |
| 2009/0176608 | A1 * | 7/2009 | Jansen et al. | 474/74 |
| 2010/0140044 | A1 | 6/2010 | Antchak et al. | |
| 2010/0178990 | A1 * | 7/2010 | Jansen et al. | 464/39 |
| 2011/0065537 | A1 * | 3/2011 | Serkh et al. | 474/94 |
| 2011/0112742 | A1 | 5/2011 | Losano et al. | |
| 2011/0162938 | A1 * | 7/2011 | Antchak et al. | 192/41 S |
| 2011/0224038 | A1 * | 9/2011 | Aantchak et al. | 474/94 |
| 2012/0298474 | A1 * | 11/2012 | Ward et al. | 192/41 S |
| 2012/0299415 | A1 * | 11/2012 | Antchak et al. | 310/78 |
| 2013/0037370 | A1 * | 2/2013 | Marion et al. | 192/55.5 |
| 2013/0056328 | A1 * | 3/2013 | Antchak et al. | 192/41 S |
| 2013/0092501 | A1 * | 4/2013 | Schneider et al. | 192/41 S |
| 2013/0217524 | A1 * | 8/2013 | Antchak et al. | 474/94 |
| 2013/0233670 | A1 * | 9/2013 | Ward et al. | 194/41 S |
| 2013/0237351 | A1 * | 9/2013 | Marion | 474/70 |
| 2014/0008175 | A1 * | 1/2014 | Schneider et al. | 192/41 S |
| 2014/0076683 | A1 * | 3/2014 | Williams | 192/41 S |
| 2014/0141892 | A1 * | 5/2014 | Williams | 464/40 |
| 2014/0291104 | A1 * | 10/2014 | Boyes | 192/75 |
| 2014/0305765 | A1 * | 10/2014 | Serkh | 192/41 S |

FOREIGN PATENT DOCUMENTS

| | | | |
|---|---|---|---|
| DE | 102007047394 | A1 | 4/2008 |
| EP | 781906 | A1 | 7/1997 |
| EP | 781906 | B1 | 7/1997 |
| EP | 781906 | A4 | 11/1997 |
| GB | 883608 | A | 12/1961 |
| JP | 2006516705 | A | 7/2006 |
| WO | 03104673 | A1 | 12/2003 |
| WO | 2004011818 | A1 | 2/2004 |
| WO | 2005028899 | A1 | 3/2005 |
| WO | 2005057037 | A1 | 6/2005 |
| WO | 2006081657 | A1 | 8/2006 |
| WO | 2007003052 | A1 | 1/2007 |
| WO | 2009118834 | A1 | 10/2009 |
| WO | 2010048732 | A1 | 5/2010 |
| WO | 2010099605 | A1 | 9/2010 |
| WO | 2011072391 | A1 | 6/2011 |
| WO | 2011147024 | A1 | 12/2011 |
| WO | 2011160208 | A1 | 12/2011 |

OTHER PUBLICATIONS

English language translation of Office Action for JP2013533439 dated Aug. 31, 2015; 5 pages.
English language translation of the second Office Action for CN201180031578 dated May 5, 2015; 6 pages.
Search Report for EP2585727 dated Feb. 26, 2018; 7 pages.
PCT/CA2012/000741, Search Report, Dec. 3, 2012.

* cited by examiner

DECOUPLER ASSEMBLY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims the benefit and priority of U.S. Provisional Patent Application No. 61/521,205, filed Aug. 8, 2011. The entire disclosure of the above application is incorporated herein by reference.

FIELD

The present disclosure relates to a decoupler assembly with a torsion spring outside of a clutch.

BACKGROUND

It is known to provide a decoupler assembly on an accessory, such as an alternator, that is driven by a belt from an engine in a vehicle to permit the associated accessory to overrun the pulley that is engaged to the belt as needed. Exemplary decoupler assemblies are disclosed in U.S. Pat. Nos. 7,618,337, 7,712,592, 7,975,821, 8,047,920 and 8,132,657 and International Patent Application Publication No. WO 2011/160208 (John R. Antchak, Warren Williams & James Dell). The benefits of such decoupler assemblies are well known in the art, and include, for example, a lowering of the belt tension needed to drive the decoupler assembly-equipped accessory so that less energy is needed to drive the operate the accessory. In the context of a vehicle accessory drive, the lowering of belt tension is commensurate with an improvement in fuel economy.

While the known decoupler assemblies work well for their intended purpose, decoupler assemblies are nonetheless susceptible to improvement and such improvements may beneficially lower the cost of a decoupler assembly.

SUMMARY

This section provides a general summary of the disclosure, and is not a comprehensive disclosure of its full scope or all of its features.

In one form, the present teachings provide a decoupler assembly (20) that includes a hub (22), a driver sleeve (30), a pulley (24), a torsion spring (28) and a wrap spring (32). The driver sleeve (30) is mounted about the hub (22) and has a clutch surface (74). The pulley (24) is configured to engage an endless drive element (14). The torsion spring (32) is received between the pulley (24) and the driver sleeve (30) and is configured to transmit rotary power in a predetermined rotational direction from the pulley (24) to the driver sleeve (30). The wrap spring (32) has a first end (84), a second end (86) and a plurality of coils (88) between the first and second ends (84, 86). The first end (84) is drivingly connected to the hub (22). The coils (88) are frictionally engaged to the clutch surface (74) and wound such that the coils (88) tend to expand when rotary power is transmitted from the pulley (24) to the hub (22) in the predetermined rotational direction.

In another form, the present teachings provide a method of assembling a decoupler assembly (20). The method includes: providing a hub (22); sliding a wrap spring (32) onto the hub (22), and operatively connecting a first end (84) of the wrap spring (32) to the hub (22); sliding a driver sleeve (30) onto the hub (22) over the wrap spring (32) to form a subassembly comprising the hub (22), the wrap spring (32) and the driver sleeve (30), wherein the driver sleeve (30) includes a clutch surface (74), a driver member (54) and an anti-ramp member (76), the clutch surface (74) being engaged to coils (88) of the wrap spring (32); providing a pulley (24); drivingly coupling a helical torsion spring (28) into the pulley (24); inserting the subassembly into the pulley (24) after step e); and rotating one of the pulley (24) and the hub (22) in a selected rotational sense relative to the other one of the pulley (24) and the hub (22) until the driver member (54) on the driver sleeve (30) is engaged with a second helical end (53) of the torsion spring (32) and a driver wall (52) on the pulley (24) is engaged with the first helical end (50) of the torsion spring (28).

In still another form, the present teachings provide a decoupler assembly (20) that includes a hub (22), a driver sleeve (30), a wrap spring (32), a pulley (24), a helical torsion spring (28) and at least one bearing element (26, 27). The hub (22) defines a slot (89). The driver sleeve (30) is mounted about the wrap spring (32) and includes a flange portion (80) and a clutch surface (74). The flange portion (80) has a driver member (54). The wrap spring (32) is disposed about the hub (22) and includes a first end (84), a plurality of coils (88), and a second end (86). The first end (84) is received in the slot (89) and the plurality of coils (88) are frictionally engaged to the clutch surface (74). The pulley (24) has a helical ramped slot (51) that forms a driver wall (52). The helical torsion spring (28) is disposed radially between the pulley (24) and the driver sleeve (30). The helical torsion spring (28) has a first helical end (116) and a second helical end (53). The first helical end (116) is abutted against the driver wall (52), while the second helical end (53) is abutted against the driver member (54). The at least one bearing element (26, 27) supports the pulley (24) for rotation on the hub (22).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 8:
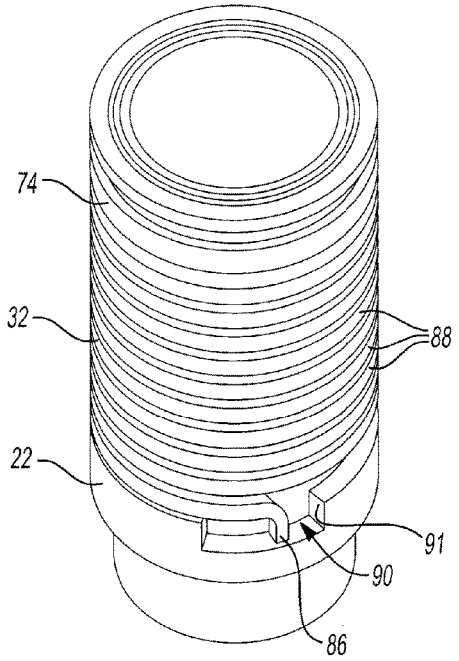
Figure 9:
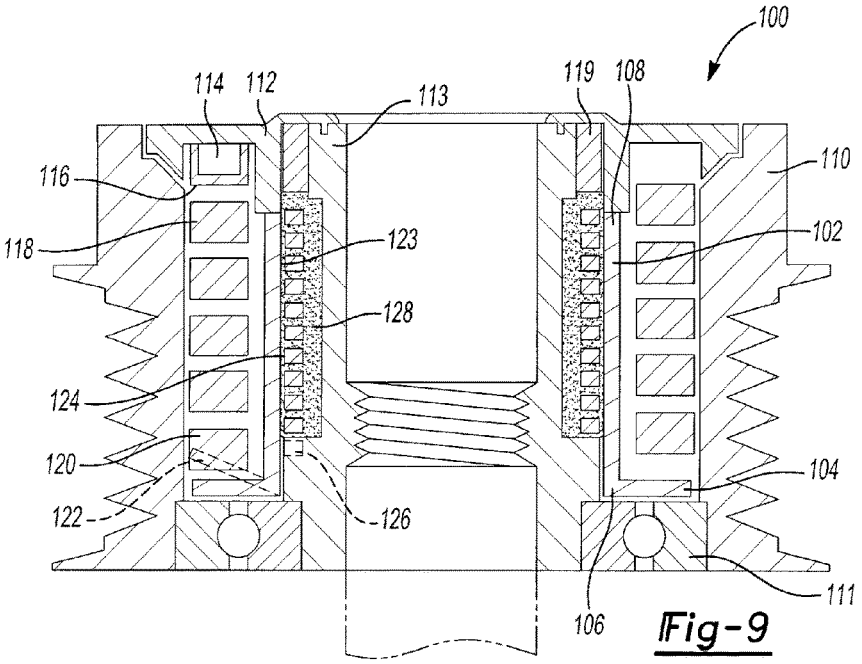

FIG. 8 is a perspective view of a portion of another decoupler assembly constructed in accordance with the teachings of the present disclosure, the decoupler assembly having an optional torque limiting feature provided between the hub and the wrap spring; and FIG. 9 is a longitudinal section view of still another decoupler assembly constructed in accordance with the teachings of the present disclosure.

Corresponding reference numerals indicate corresponding parts throughout the several views of the drawings.

DETAILED DESCRIPTION

Figure 1:
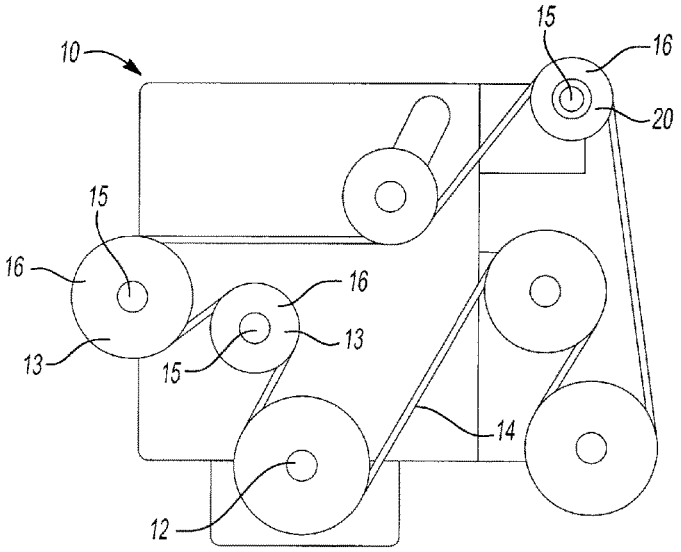
FIG. 1 is a schematic illustration of an engine with a front accessory drive having a belt and a plurality of belt-driven accessories, wherein one of the belt-driven accessories has a decoupler assembly constructed in accordance with the teachings of the present disclosure.

In FIG. 1, an engine 10 for a vehicle can includes a crankshaft 12 that can drive an endless drive element, such as a belt 14, for example. The belt 14 can be employed to transmit rotary power from the engine 10 to a plurality of accessories 16 (shown in dashed outlines), such as an alternator and a compressor. Each of the accessories 16 can have an input shaft 15 that is configured to receive rotary power. Some of the accessories 16 have a conventionally constructed pulley 13 that is mounted to the input shaft 15 and configured to drivingly engage the belt 14. One of more of the accessories 16 can have a decoupler assembly 20 mounted to the input shaft 15. The decoupler assembly 20 is configured to facilitate the transfer of rotary power from the belt 14 to the shaft 15, as well as to automatically decouple the shaft 15 from the belt 14 when the belt 14 decelerates relative to the shaft 15 by a predetermined amount so that the shaft 15 does not drive the belt 14. Additionally, the decoupler assembly 20 permits the speed of the belt 14 to oscillate relative to the shaft 15. Thus, oscillations in the belt speed that are the result of oscillations in the speed of the crankshaft (an inherent property of internal combustion piston engines), are dampened by the decoupler assembly 20, and as a result, the stresses that would otherwise be incurred by the shaft 15 and the accessory 16 are reduced.

Figure 2:
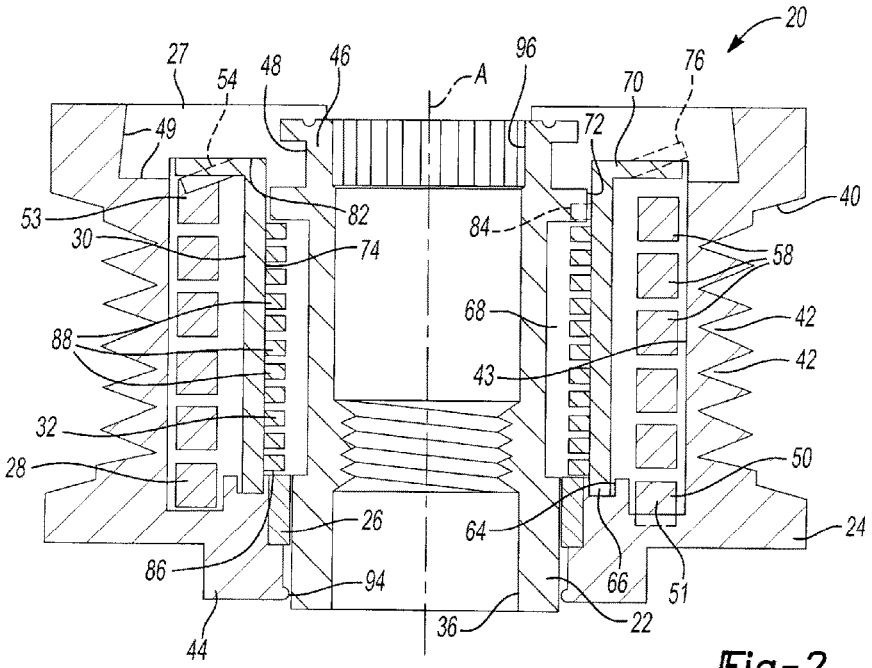
FIG. 2 is a longitudinal sectional view of the decoupler assembly of FIG. 1.

With additional reference to FIG. 2, the decoupler assembly 20 can include a hub 22, a pulley 24, a first bearing member 26, a second bearing member 27, a torsion spring 28, a driver sleeve 30 and a wrap spring 32. The torsion spring 28, the driver sleeve 30 and the wrap spring 32 can be considered to be a mechanism that is configured to transmit rotary power from the pulley 24 to the hub 22, while the wrap spring 32 and at least a portion of the driver sleeve 30 (e.g., the clutch surface 74) can be considered to be a one-way clutch.

The hub 22 can be mounted to the input shaft 15 in any suitable way such that the hub 22 and the input shaft 15 co-rotate about a rotational axis A. For example, the hub 22 can have a shaft-mounting aperture 36 formed therethrough that is used for the mounting of the hub 22 to the end of the input shaft 15. In one form, the shaft-mounting aperture 36 can be threaded to the end of the input shaft 15. In another form, the shaft-mounting aperture 36 can be configured to be received over threads on the end of the input shaft 15 and a nut (not shown) can exert a clamping force onto the hub 22 to secure the hub 22 to the input shaft 15. In still another form, the end of the input shaft 15 can be generally cylindrically shaped and can be received into the shaft mounting aperture 36. If desired, the fit between the end of the input shaft 15 and the shaft-mounting aperture 36 can be an interference fit or press-fit. Additionally or alternatively, a fastener (not shown) could be threaded into an axial end of the input shaft 15 and can be configured to exert a clamping force onto the hub 22 to further secure the hub 22 to the input shaft 15. It will also be appreciated that a key (not shown) could be employed between the input shaft 15 and the hub 22 to inhibit relative rotation between the hub 22 and the input shaft 15.

The pulley 24 can be disposed generally concentrically about the hub 22 such that it is rotatable about the rotational axis A. The pulley 24 can have an outer surface 40 and an inner surface 43. The outer surface 40 can be configured to drivingly engage the belt 14 such that rotary power is transmitted from the belt 14 to the pulley 24. The outer surface 40 can have one or more grooves 42 that are configured to matingly engage the belt 14. In the particular example provided, the outer surface 40 is configured to matingly engage a poly-V belt, but it will be appreciated that other outer surface configurations can be employed without departing from the teachings of the present disclosure.

The first bearing member 26 can support the pulley 24 for rotation on the hub 22 at a first axial end 44 of the pulley 24, such as the proximal end of the pulley 24. The first bearing member 26 may be any suitable type of bearing member, such as a rolling element bearing (e.g., ball bearing) or a bushing made from a suitable metal (e.g., bronze) or a suitable polymeric material, such as Torlon®, a commercially-available polyamide-imide product manufactured by Solvay Advanced Polymers of Houston, Tex., USA, or Teflon PX9, a commercially-available polytetrafluoroethylene manufactured by E. I. duPont de Nemours & Co. of Wilmington, Del., USA. In situations where the first bearing member 26 is a bushing, the first bearing member 26 can be formed as a single, unitarily and discrete structure and coupled to the pulley 24 (either as an assembly, or by forming the pulley 24 onto the bushing), or could be formed directly onto the pulley 24 in a desired manner, such as through molding.

The second bearing member 27 can be positioned at a second axial end 46 of the pulley 24, such as a distal end of the pulley 24. The second bearing member 27 can support the pulley 24 for rotation on a pulley support surface 48 of the hub 22. The second bearing member 27 can be mounted to the pulley 24 and to the hub 22 in any suitable manner. For example, the second bearing member 27 can be molded to/formed onto the pulley support surface 48 in an injection molding process in which the hub 22 is received into the mold. If desired, the hub 22 may be coated (in part or in whole) prior to insertion into the mold to provide the surface of the hub 22 with one or more desirable additive properties. For example, the hub 22 may be coated to prevent adherence of the second bearing member 27 to the pulley support surface 48 during the molding process to ensure that the second bearing member 27 will rotate about the hub 22.

The second bearing member 27 may be press-fit into a seat 49 on the pulley 24, and/or in situations where the pulley 24 and second bearing member 27 are made from suitable and compatable polymeric or metallic materials, the second bearing member 27 can be welded (e.g. laser welded) to the pulley 24. In such instances, the material of the pulley 24 and the material of the second bearing member 27 are selected so as to be compatible for joining by whatever suitable joining process is selected, such as laser welding.

Figure 3:
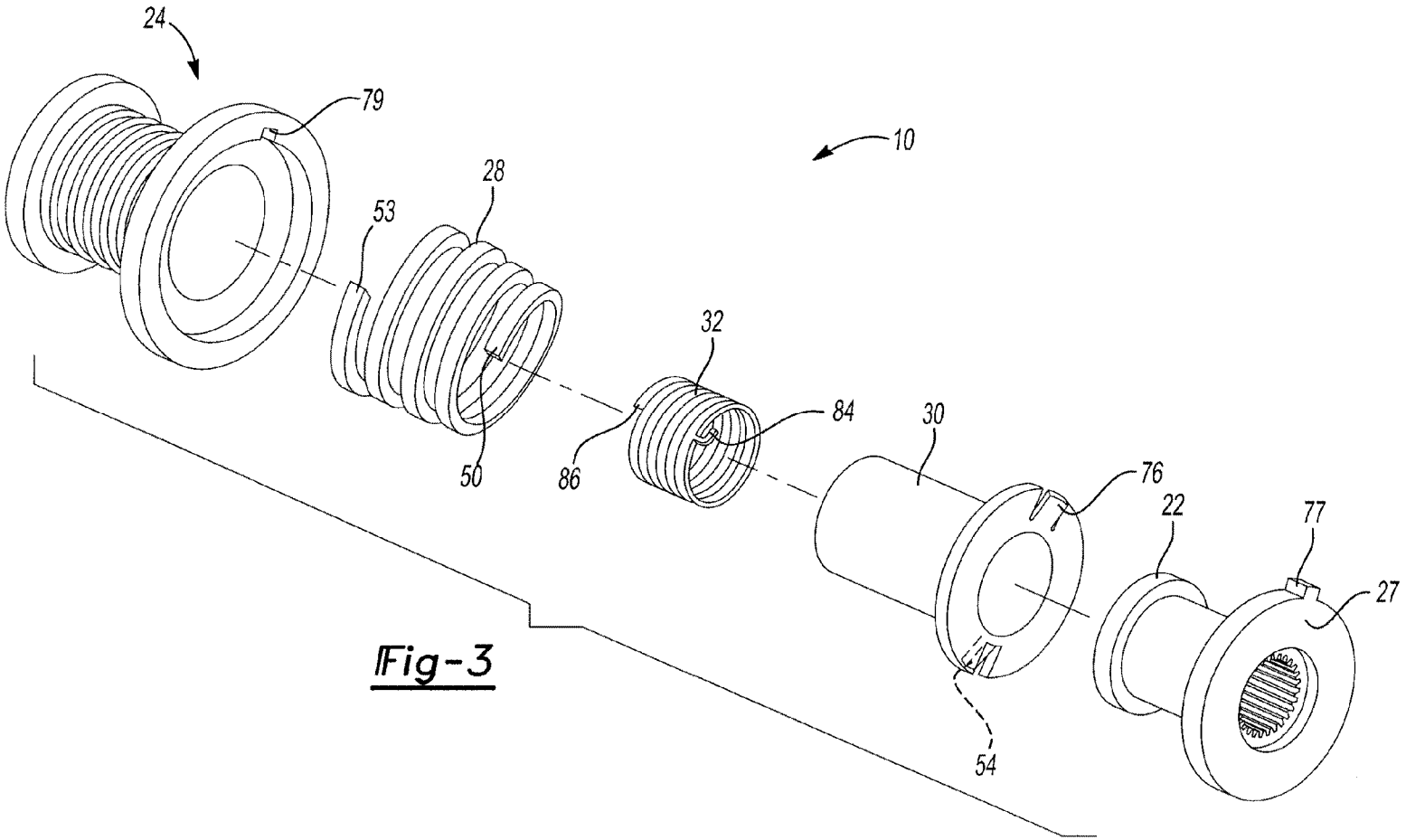
FIG. 3 is an exploded perspective view of the decoupler assembly of FIG. 1.
Figure 4:
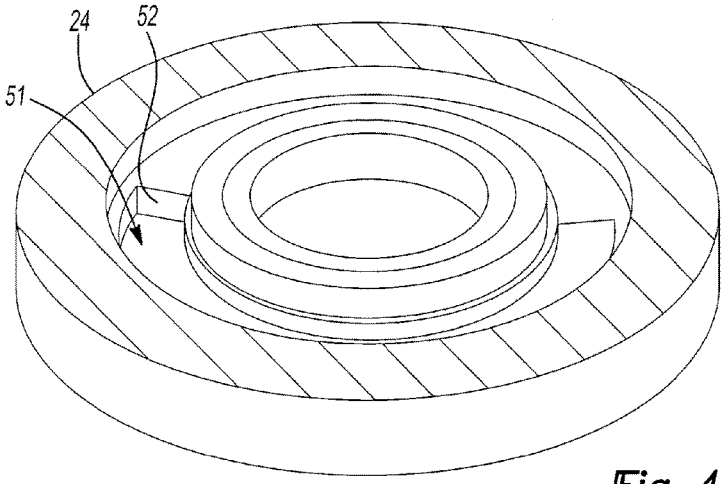
FIG. 4 is a perspective section view of a portion of the decoupler assembly of FIG. 1, illustrating a portion of the pulley of the decoupler assembly.
Figure 5:
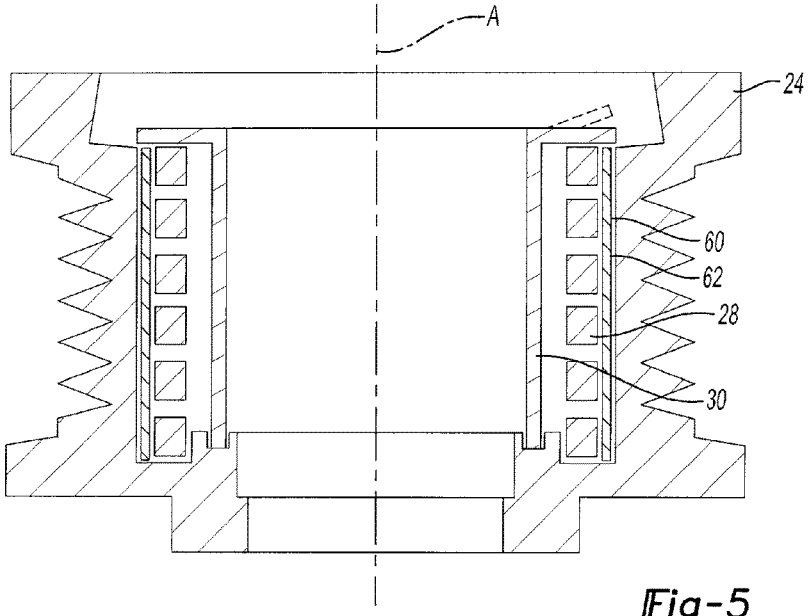
FIG. 5 is a longitudinal sectional view of a portion of a second decoupler assembly constructed in accordance with the teachings of the present disclosure.

With reference to FIGS. 2 through 4, the torsion spring 28 can be a helical torsion spring that can have a first helical end 50 and a second helical end 53. The first helical end 50 can be held in an annular slot 51 (FIG. 2) and that abuts a radially extending driver wall 52 (FIG. 4) in the pulley 24. The second helical end 53 can engage a driver tab or member 54 on the driver sleeve 30. In the particular example illustrated, the torsion spring 28 has a plurality of coils 58 that are disposed axially between the first and second ends 50 and 53. The coils 58 can be spaced apart from one another as desired, and an axially compressive load may be applied to the torsion spring 28 so that the first and second helical ends 50 and 53 of the torsion spring 28 are abutted against the pulley slot 51 and the driver sleeve 30, respectively, so that the torsion spring 28 is in driving engagement with the driver wall 52 and the driver member 54 respectively.

The torsion spring 28 can be made of a suitable wire material, such as spring steel wire, and the wire material can have any desired cross-sectional shape, including circular, square and rectangular. If desired, an expansion limiter restrictor 60 may be disposed between the torsion spring 28 and the pulley 24. Expansion restrictors are described in detail in U.S. Pat. No. 7,766,774 (Antchak et al.), the disclosure of which is incorporated by reference as if fully set forth in detail herein. Those of skill in the art will appreciate that the expansion restrictor 60 can limit radial expansion of the torsion spring 28 to thereby limit the magnitude of the shear forces that are transmitted through the wire of the torsion spring 28. Frictional contact between the expansion restrictor 60 and the torsion spring 28, and optionally between the expansion restrictor 60 and the pulley 24, can create an additional load path for transmitting rotary power from the pulley 24 to the driver sleeve 30.

The driver sleeve 30 can be received radially inside the torsion spring 28, where it can transmit rotary power from the torsion spring 28 to the wrap spring 32. The driver sleeve 30 can have a first axial end 64 and a second axial end 70. The first axial end 64 can engage a slot 66 in the pulley 24. The first axial end 64 and the pulley 24 can cooperate to form a seal or labyrinth that closes one end of a chamber 68 into which the wrap spring 32 can be received. The second axial end 70 can cooperate with a surface 72 on the hub 22 to form another seal or labyrinth that closes a second, opposite end of the chamber 68. Alternatively or additionally, the driver sleeve 30 may have a cylindrical projection (not shown) that can engage a slot (not shown) in the second bearing member 27 to form a seal for the chamber 68. Additionally or alternatively, a seal member, such as an o-ring (not shown) or any other suitable sealing structure, could be provided to form a seal for closing an end of the cavity 68.

The driver sleeve 30 may be made from any suitable material, such as aluminum, steel, etc. The driver sleeve 30 may be formed in any desired manner (as a weldment, stamping, or compacted powdered metal) and can be machined as needed/desired. The driver sleeve 30 can be a single piece construction or multi-piece construction. The driver sleeve 30 can have an inner surface (i.e., a clutch surface) 74, the driver member 54 and a flange portion 80. The clutch surface 74 can be engaged by the wrap spring 32 and can be hardened in a suitable manner if desired. The clutch surface 74 can be formed to relatively tight tolerances (e.g., diameter, cylindricity, runout, surface finish) so that the decoupler assembly 20 will operate with a desired level of accuracy and repeatability. The aforementioned driver member 54 can be coupled to the second axial end 70 of the driver sleeve 30 and can engage the second helical end 53 of the torsion spring 28. The flange portion 80 can be located at the second axial end 70 and can be received in a seat 82 in the second bearing member 27. A modicum of axial clearance can be provided to permit relative rotation between the driver sleeve 30 and the second bearing member during operation of the decoupler assembly 20.

Figure 6:
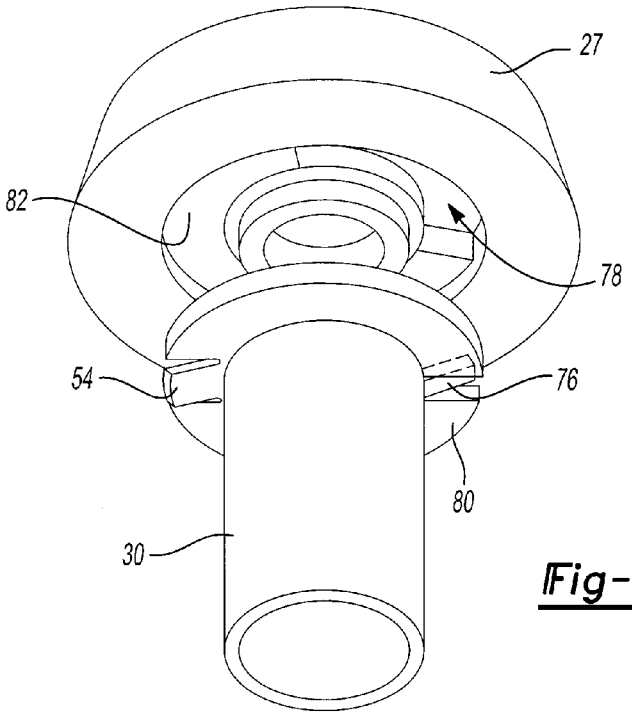
FIG. 6 is an exploded perspective view of a portion of the decoupler assembly of FIG. 1, illustrating a driver sleeve and a bearing member.

The driver sleeve 30 can include an anti-ramp system that can have an anti-ramp member 76 (which may be referred to in the exemplary embodiment shown as an anti-ramp tab 76) and an anti-ramp slot 78 (FIG. 6). The anti-ramp member 76 can extend axially outwardly from the second axial end 70 so that it may be received into the anti-ramp slot 78. In the particular example provided, the anti-ramp slot 78 is formed in the second bearing member 27, but it will be appreciated that the anti-ramp slot 78 could be formed in the pulley 24 in the alternative. The anti-ramp tab 76 can move in the anti-ramp slot 78 to permit relative rotational movement between the driver sleeve 30 and the pulley 24 within a desired range of movement. It will be appreciated that contact between the anti-ramp tab 76 and a first edge of the anti-ramp slot 78 can halt relative rotation between the driver sleeve 30 and the pulley 24 when the torsion spring 28 is unloaded to maintain a desired amount of torsional preload on the torsion spring 28. Construction in this manner may be desirable so that the first and second helical ends 50 and 53 of the torsion spring 28 stay engaged to the driver wall 52 and the driver member 54, respectively, so that the first helical end 50 of the torsion spring 28 does not travel up the helical ramped slot 51. It will be noted that the other end of the anti-ramp slot 78 can be employed to limit the amount of relative rotation that can occur between the pulley 24 and the driver sleeve 30 when a relatively large rotary load is transmitted from the pulley 24 to the driver sleeve 30. In such situations, those of skill in the art will appreciate that a portion of the rotary load is transmitted to the driver sleeve 30 without first passing through the torsion spring 28. The anti-ramping structure may be similar to the anti-ramping structure described in U.S. Pat. No. 7,712,592 (Jansen & Antchak), the disclosure of which is incorporated herein by reference.

So that the correct angular relationship exists between the anti-ramp slot 78 and the driver wall 52 on the pulley 24, a key 77 (FIG. 3) could be molded into the second bearing member 27 and engaged to a keyway 79 that can be formed in the pulley 24. Those of skill in the art will appreciate from this disclosure that the mating of the key 77 to the keyway 79 will permit assembly of the second bearing member 27 to the pulley 24 in one (i.e., a singular and exclusive) angular position.

While the anti-ramp system has been described as including an anti-ramp tab 76 associated with the driver sleeve 30 and an anti-ramp slot 78 associated with either the pulley 24 or the second bearing member 27, it will be appreciated that the anti-ramp slot 78 could be associated with the driver sleeve 30 and the anti-ramp tab 76 associated with either the pulley 24 or the second bearing member 27.

Figure 7:
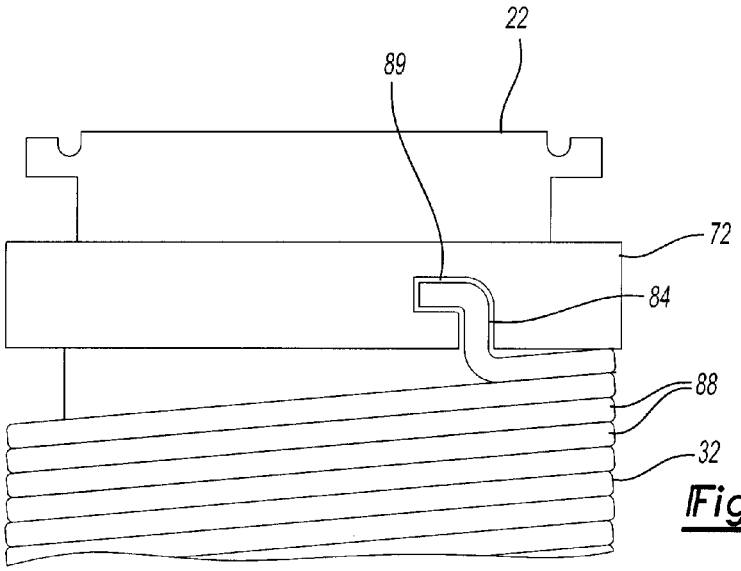
FIG. 7 is an elevation view of a portion of the decoupler assembly of FIG. 1, illustrating a hub and a wrap spring.

The wrap spring 32 can be received in the chamber 68 and can comprise a first end 84, a second end 86 and a plurality of coils 88 therebetween. The first end 84 may extend into a suitable wrap spring receiving slot 89 (best seen in FIG. 7) in the hub 22. The second end 86 may be free. The wrap spring 32 has an outer surface 92 which engages the clutch surface 74 of the driver sleeve 30.

The chamber 68 may be filled with a suitable lubricant such as Krytox®, manufactured by E. I. duPont de Nemours & Co. of Wilmington, Del., USA. The chamber 68 can be sealed on its opposite ends by any satisfactory means. For example, a first end of the chamber 68 can be sealed by virtue of engagement between the driver sleeve 30 and the hub 22, or alternatively by engagement between the driver sleeve 30 and the second bearing member 27 and engagement between the second bearing member and the hub 22. As another example, a second, opposite end of the chamber 68 can be sealed by virtue of engagement between the driver sleeve 30 and the pulley 24, or alternatively by engagement between the pulley 24 and the first bearing member 26 and by engagement between the first bearing member 26 and the hub 22. An additional seal shown at 94 may optionally be provided between the pulley 24 and the hub 22 to inhibit egress of lubricant from the decoupler assembly 20 in the event that the lubricant migrates past the seals between the hub 22 and the first bearing member 26.

In general, the angular relationship between the pulley 24 on the hub 22 (and consequently, the angular relationship between the coils 88 of the wrap spring 32 and the first end 84 of the wrap spring 32) will change as the load transmitted through the decoupler assembly 20 increases. It can be desirable in some situations to place an upper limit on the angular relationship. Accordingly, an optional torque limiting structure is illustrated in FIG. 8 to limit the amount of rotary power that can be transmitted through the decoupler assembly 20. In the particular example provided, the torque limiting structure comprises the second end 86 of the wrap spring 32 and a torque limiter slot 90 that is formed on the hub 22. The second end 86 of the wrap spring 32 is received into the torque limiter slot 90. As the angular relationship between the driver sleeve 30 and the hub 22 changes, the second end 86 of the wrap spring 32 will move in the slot 90. If the second end 86 moves so far that it engages the end 91 of the slot 90, any further relative rotation of the driver sleeve 30 causes the wrap spring 32 to coil more tightly so that the coils 88 contract radially inwardly from the clutch surface 74 on the driver sleeve 30, thereby limiting the amount of torque that can be transferred to the coils 88 from the driver sleeve 30. A suitable structure is shown and described in PCT publication WO2010048732 (Antchak et al.), the entirety of which is incorporated herein by reference.

During use, when the pulley 24 is driven and the hub 22 is stationary, the driver sleeve 30 is driven by the pulley 24 (via the torsion spring 28) to rotate. Since the coils 88 of the wrap spring 32 are frictionally engaged to the clutch surface 74 of the driver sleeve 30, and due to the manner in which the way (i.e., direction) that the coils 88 of the wrap spring 32 are wound, rotation of the driver sleeve 30 tends to unwind the coils 88 of the wrap spring 32 such that the coils 88 more fully engage the clutch surface 74. Additionally, the shaft of the accessory to which the decoupler assembly 20 is coupled resists rotation so that the first end 84 of the wrap spring 32 pushes in an axial direction (i.e., along the longitudinal axis of the wire that forms the first end 84 of the wrap spring 32) against the hub 22 such that the resulting reaction force on the wire of the wrap spring 32 helps to cause radial expansion of the coils 88 of the wrap spring 32.

The rotation of the driver sleeve 30 combined with the resistance to rotation of the hub 22 cause the wrap spring 32 to expand, driving the wrap spring 32 into stronger engagement with the driver sleeve 30 so that the driver sleeve 30 and the wrap spring 32 co-rotate, which permits the first end 84 of the wrap spring 32 to exert an axially directed force (i.e., a force directed along the longitudinal axis of the wire that forms the first end 84 of the wrap spring 32) against the hub 22 to cause corresponding rotation of the hub 22.

In situations where the pulley 24 decelerates more quickly than the hub 22 by a predetermined amount, the slowing of the pulley 24 relative to the wrap spring 32 can tend to wind the coils 88 of the wrap spring 32 more tightly so that their engagement with the clutch surface 74 lessens to the point where the pulley 24 can slip relative to the wrap spring 32 so that the hub 22 can overrun the pulley 24.

Those of skill in the art will appreciate that the torsion spring 28, the driver sleeve 30 and the wrap spring 32 can be considered to be a mechanism that is configured to transmit rotary power from the pulley 24 to the hub 22, while the wrap spring 32 and at least a portion of the driver sleeve 30 (e.g., the clutch surface 74) can be considered to be a one-way clutch.

As compared to a prior art decoupler assembly, the present decoupler assembly 20 can be relatively less expensive to manufacture for one or more of the reasons that follow. For example, because the clutch surface for the wrap spring was formed on the inside diameter of the pulley of a prior art decoupler assembly, those pulleys were typically formed in their entirety of high-grade steel so that the clutch surface would resist galling or wear from the wrap spring 32. As such, the prior art decouplers typically had requirements for the painting (e.g., electrocoating) of the outside surfaces of those pulleys for both aesthetic purposes and corrosion resistance. Since it was not desirable to have the paint extend onto the inner (clutch) surface, those pulleys would typically go through a masking process prior to the application of the paint and an unmasking process after the paint had sufficiently cured.

In contrast, the present decoupler assembly 20 employs a driver sleeve 30 that is separate from the pulley 24 so that cost savings in several areas may be realized. For example, the present configuration employs high-strength materials in targeted areas (i.e., the clutch surface 74), as well as configures the clutch surface 74 so that it is relatively smaller than the clutch surface of a correspondingly sized prior art decoupler assembly. Consequently, less high-strength material is used in the decoupler assembly 20 relative to a prior art decoupler assembly. Moreover, the separation of the pulley 24 from the clutch surface 74 permits the pulley 24 to be formed of lower-strength material (e.g., plastic, zinc, aluminum, lower-strength steel) and/or a lighter material and/or an easier machined material (e.g., free machining, high-speed leaded alloy steel) and/or with a relatively small radial thickness and/or using standard pulley forming techniques (e.g., spinning) that permit the pulley 24 to be efficiently and robustly formed with relatively little material. It will be appreciated, too, that because the clutch surface 74 is separated from the pulley 24, tolerances on the pulley 24 need not be held as tight as for the pulley of a prior art decoupler assembly so that pulley manufacturing costs can be reduced. In this regard, high-tolerance machining on the inside diameter of the pulley 24 need not be performed, so that the manufacturing process can be shortened. Moreover, the tooling for gauging the inside diameter of the pulleys 24 can be relatively less complicated and costly. For example, go/no-go gauges can be employed to gauge the inside diameter of the pulley 24, whereas the inside diameter of the pulley of a prior art decoupler assembly would typically be gauged with an air gauge (air plug) so that the diameter, cylindricity and/or roundness of the clutch surface can be verified.

Additionally, since the driver sleeve 30 is an "internal" component of the decoupler assembly 20 and is not visible/exposed to moisture, the driver sleeve 30 need not be painted. To the extent that customer specifications require paint on the pulley 24, the pulley 24 can be painted without the need for masking (and unmasking). It will also be appreciated that the pulley 24 could be formed of a plastic (polymeric) material in a suitable process (e.g., injection molding) and that in such cases, a color component could be mixed with/a component of the plastic material so that the pulley 24 was colored consistently throughout.

For example, the pulley 24 could be formed of any suitable polymeric material, such as a type of phenolic, or a glass-reinforced nylon. As a result, the pulley 24 could be formed in a suitable manner (e.g., injection molded), and can be configured with a desired surface finish. Furthermore, the material can be of a selected colour, so that the pulley is a selected colour for appearance purposes, without the need for paint. Paint or some similar coating may be needed for some metallic pulleys, however it is susceptible to scratches which can reveal the base material underneath. A plastic (e.g., polymeric) pulley, however, even if scratched, remains the same colour since the colour extends throughout it, therefore making it less susceptible to rejection from being scratched. This eliminates a basis for rejecting the pulley 24 and as such, correspondingly reduces the costs for manufacturing the decoupler assembly 20.

Furthermore, a polymeric pulley 24 can be significantly less expensive to manufacture than a painted pulley due to lower cost of materials, elimination of the coating step. Additionally, because the pulley 24 is not engaged with the wrap spring 32, the inner surface 43 of the pulley 24 need not be formed with very tight tolerances. By contrast, pulleys of the prior art that directly engage the wrap spring can in some cases require strict dimensional control on the pulley inner surface that engages the wrap spring so that the wrap spring operates as intended.

The pulley 24 may nonetheless be made from a metallic material, such as a steel, or aluminum. Even when made from steel, however, the pulley 24 may be made less expensive than some pulleys of the prior art used in decoupler assemblies. For example, the pulley 24 may be made from a spinning and forming process as necessary to achieve a pulley shape. Such as pulley is described in U.S. Pat. No. 4,273,547. Such a pulley would be usable because it is not in engagement with the wrap spring 32 and so tight tolerances are not required on its inner surface 43.

Furthermore, due to the positioning of the torsion spring outside of the wrap spring, there is more freedom of selection in the diameter and the axial length of the torsion spring 28. Regarding the diameter of the torsion spring 28, a designer of the decoupler has greater latitude in selecting the degree of torsion without concerns for enlarging the wrap spring clutch. Regarding the axial length of the torsion spring 28, the torsion spring can be lengthened without lengthening the overall decoupler assembly 20. As a result of this greater freedom, an axially longer spring 28 may be used which has more coils 88 than would be possible with a similarly sized prior art decoupler assembly having a torsion spring that is radially inside a wrap spring. Also, it may be possible to configure the torsion spring 28 such that it has a selected number of coils 58 without the need to grind or machine the first and second helical ends 50 and 53 flat, as is carried out on some torsion springs that are inside the wrap spring in prior art decoupler assemblies. This further reduces the cost of the torsion spring 28 compared to some torsion springs of the prior art.

The positioning of the torsion spring outside of the wrap spring also provides a relative reduction in the surface speed of the interface where the clutch surface and the coils of the wrap spring contact one another. Because of the relative reduction in surface speed, forces acting on the clutch surface may be reduced thereby providing several further opportunities for reducing cost. For example, the lower loads may provide an opportunity to axially shorten the wrap spring; use a wire for the wrap spring that is smaller in diameter; select a different, lower strength, material for the driver sleeve; and/or select a different heat treatment process for the driver sleeve.

Aside from the advantages described above that arise from the separation of the clutch surface 74 from the pulley 24, the decoupler assembly 20 may be easier and less expensive to manufacture than some prior art decoupler assemblies. For example, the present decoupler assembly 20 could (but need not) be assembled by the following method. It will be appreciated that the steps of the method described below need not be followed in the exact order that is set out in the discussion.

A sub-assembly is provided that consists of the hub 22, the second bearing member 27, the driver sleeve 30 and the wrap spring 32. The second bearing member 27 can be assembled to a distal end of the hub 22. The wrap spring 32 may be installed on the hub 22 such that the first end 84 is placed into the slot 90 in the hub 22, which can help to prevent the wrap spring 32 from separating from the hub 22. A suitable lubricant may then be applied to the wrap spring 32. The driver sleeve 30 can be installed over the wrap spring 32 and into its seat 82 on the second bearing member 27. Even though the driver sleeve 30 can rotate relative to the wrap spring 32 when the decoupler assembly 20 is at rest, the wrap spring 32 is nonetheless still sufficiently frictionally engaged with the inner surface 74 of the driver sleeve 30 that it can prevent the driver sleeve 30 from falling off when the sub-assembly is picked up.

The torsion spring 28 can be inserted into the pulley 24. The sub-assembly can be then inserted fully into the pulley 24 so that the hub 22 is captured in the first bearing member 26.

It will be noted that, during the assembly process it is possible for the torsion spring 28 to have been initially installed in the incorrect angular position, such that its first helical end 50 is not in abutment with the driver wall 52 of the pulley 24. Additionally, it is possible for the driver sleeve 30 to have been initially installed in the incorrect angular position (i.e. for it to have been installed with the anti-ramp tab 76 not in the anti-ramp slot 78. In such an instance, the anti-ramp tab 76 would be pushed downwards into the plane of the flange portion 80 of the driver sleeve 30 by the second bearing member 27. Also, the driver member 54 may be pushed upwards by the torsion spring 28. To adjust these components, a suitable tool (not shown) can be inserted into a tool receiving aperture 96 and the tool can be rotated to cause rotation of the hub 22 relative to the pulley 24 (the pulley 24 may be held in a stationary and non-rotating condition). The tool receiving aperture 96 may have any suitable shape, such as, for example a splined shape, or a hexagonal shape, and the end of the tool would have a complementary shape so as to permit it to rotate the hub 22. With sufficient rotation of the hub 22 relative to the pulley 24 in the proper rotational sense, sufficient relative rotation between the driver sleeve 30 and the seat 82 in the second bearing member 27 will cause the anti-ramp tab 76 to be received into the slot 78, at which point the driver sleeve 30 is in the correct position relative to the pulley 24. Sufficient relative rotation between the torsion spring 28 and the pulley 24 permits the first end 50 of the torsion spring 28 to engage the driver wall 52, while sufficient relative rotation between the torsion spring 28 and the driver sleeve 30 permits the driver member 54 on the driver sleeve 30 to engage the second helical end 53 of the torsion spring 28. At this point, the components of the decoupler assembly 20 are in their correct positions. Once this occurs, further relative rotation between the hub 22 and pulley 24 will cause an increase in torque to be applied between the two. A torque sensor can be positioned in a suitable location, for example on a mechanism that drives rotation of the tool (not shown), or on an element that holds the pulley 24 from rotating, so as to sense the applied torque or reaction torque and responsively generate a torque signal. A controller (not shown) can employ a use the torque signal to determine whether that the components of the decoupler assembly 20 are in their proper orientation. If, for whatever reason, the elements such as the torsion spring 28 or the driver sleeve 30 do not fall into their correct positions after a selected period of time or a selected number of relative rotations between the hub 22 and pulley 24, the controller (not shown) may consider the assembly defective and can discard it. Also, it should be noted, that, unless the first end 84 of the wrap spring 32 has been inserted into the slot 90 in the hub 22, the driver sleeve 30 could not be installed into position in the second bearing member 27. Thus, the components of the decoupler assembly 20 are configured so that: a. if a component is misinstalled, the decoupler assembly 20 cannot be completed, or b. if a component is misinstalled, the decoupler assembly 20 can be adjusted quickly after it has been assembled, to reposition the misinstalled components until everything is arranged correctly. Furthermore, it is easy to detect when the components have been repositioned into their correct positions (by using a torque sensor) and when the decoupler assembly 20 is defective. Yet another advantage is that the process of assembling the decoupler assembly 20 lends itself relatively easily to carrying out by an automated system. Because of the ability to easily reposition misinstalled components and to determine when they have been repositioned correctly, the automated system can even tolerate when components are fed to it in the incorrect angular position, thus making it more reliable.

With reference to FIG. 9, a second decoupler assembly 200 constructed in accordance with the teachings of the present disclosure is illustrated. The decouple assembly 100 can be generally similar to the decoupler assembly 20, but includes a driver sleeve 102 that is arranged with a flange portion 104 on the proximal end 106 of the driver sleeve 102, rather than on its distal end 108. The pulley 110 has at its proximal end a first bearing member 111 for supporting rotation of the pulley 110 on the hub 113. The pulley 110 can be connected at its distal end to an end cap 112, on which there is a tab 114 for driving a first helical end 116 of the torsion spring 118. A second bearing member 119 can support the end cap 112 for rotation on the hub 113. The end cap 112 may be made from a suitable material, such as a suitable metal, such as a suitable type of steel. The second helical end 120 of the torsion spring 118 engages a driver tab 122 at the proximal end of the driver sleeve 102. The clutch surface 123 of the driver sleeve 102 can engage the coils of the wrap spring 124, which is itself engaged at its first end 126 with the hub 113. Suitable seals may be employed to resist egress of lubricant from a chamber 128 in which the wrap spring 124 is disposed. It will be appreciated that in the particular example shown, the distal end (first helical end 116) of the torsion spring 118 is driven by the pulley 110, while the proximal end (i.e., second helical end 120) of the torsion spring 118 drives the driver sleeve 102

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

| Listing of Elements | |
|---|---|
| engine | 10 |
| crankshaft | 12 |
| pulley | 13 |
| belt | 14 |
| input shaft | 15 |
| accessory | 16 |
| decoupler assembly | 20 |
| hub | 22 |
| pulley | 24 |
| first bearing member | 26 |
| second bearing member | 27 |
| torsion spring | 28 |
| driver sleeve | 30 |
| wrap spring | 32 |
| shaft-mounting aperture | 36 |
| outer surface | 40 |
| grooves | 42 |
| ilmer surface | 43 |
| first axial end | 44 |
| second axial end | 46 |
| pulley support surface | 48 |
| seat | 49 |
| first helical end | 50 |
| second helical end | 53 |
| driver member | 54 |
| coils | 58 |
| expansion restrictor | 60 |
| first axial end | 64 |
| slot | 66 |
| chamber | 68 |
| second axial end | 70 |
| surface | 72 |
| clutch surface | 74 |
| anti-ramp tab | 76 |
| key | 77 |
| anti-ramp slot | 78 |
| keyway | 79 |
| flange portion | 80 |
| seat | 82 |
| first end | 84 |
| second end | 86 |
| coils | 88 |
| slot | 89 |
| slot | 90 |
| end | 91 |
| outer surface | 92 |
| seal | 94 |
| tool receiving aperture | 96 |
| driver sleeve | 102 |
| flange portion | 104 |
| proximal end | 106 |
| distal end | 108 |
| pulley | 110 |
| first bearing member | 111 |
| end cap | 112 |
| hub | 113 |
| tab | 114 |
| first helical end | 116 |
| torsion spring | 118 |
| second bearing member | 119 |
| second helical end | 120 |
| driver tab | 122 |
| clutch surface | 123 |
| first end | 126 |
| chamber | 128 |
| decoupler assembly | 200 |

What is claimed is:

1. A decoupler assembly comprising:

a hub;

a driver sleeve mounted about the hub, the driver sleeve defining a clutch surface;

a pulley that is configured to engage an endless drive element;

a torsion spring received between the pulley and the driver sleeve and configured to transmit rotary power in a predetermined rotational direction from the pulley to the driver sleeve; and a wrap spring having a first end, a second end and a plurality of coils between the first and second ends, the first end being drivingly connected to the hub, the coils being frictionally engaged to the clutch surface and wound such that the coils tend to expand when rotary power is transmitted from the pulley to the hub in the predetermined rotational direction.

2. The decoupler assembly of claim 1, wherein at least a portion of the pulley is made from a polymeric material.

3. The decoupler assembly of claim 1, wherein the torsion spring is a helical torsion spring.

4. The decoupler assembly of claim 1, wherein the pulley comprises a driver wall that drivingly engages a first helical end of the torsion spring, and wherein the driver sleeve has a driver member thereon that drivingly engages a second helical end of the torsion spring.

5. The decoupler assembly of claim 1, wherein one of the pulley and the driver sleeve includes an anti-ramp slot, wherein the other one of the pulley and the driver sleeve includes an anti-ramp member that extends into the anti-ramp slot, and wherein the anti-ramp member and the anti-ramp slot cooperate to limit relative rotation between the driver sleeve and the pulley to a predetermined angular range.

6. The decoupler assembly of claim 1, wherein the wrap spring is received in a chamber that is at least partly defined by the driver sleeve and the hub, wherein a lubricant is received in the chamber.

7. The decoupler assembly of claim 1, further comprising an expansion limiter that is mounted on the torsion spring, the expansion limiter being configured to be driven by the torsion spring into contact with the pulley when a load transmitted through the torsion spring exceeds a predetermined load.

8. The decoupler assembly of claim 1, wherein the driver sleeve includes a flange portion that axially constrains an axial end of the torsion spring.

9. The decoupler assembly of claim 1, wherein the torsion spring is made from wire having a circular cross-sectional shape.

10. The decoupler assembly of claim 1, wherein the wire that forms the torsion spring has a cross-sectional shape that is constant.

11. The decoupler assembly of claim 1 wherein first and second bearing members are positioned between the pulley and the hub, and support relative rotation between the pulley and the hub.

12. The decoupler assembly of claim 11, wherein the first and second bearing members are bushings which are fixedly connected to the pulley.

13. A method of assembling a decoupler assembly comprising:

a) providing a hub;

b) *coupling a driver sleeve to the hub, the driver sleeve including a radially inner surface defining a clutch surface and a driver member;*

*c*) sliding a wrap spring onto the hub, and operatively connecting [a first end of] the wrap spring to the hub *to form a subassembly comprising the hub, the wrap spring and the driver sleeve, the wrap spring being positioned in a chamber that is at least partly defined by the clutch surface of the driver sleeve and the hub, the wrap spring including a plurality of coils being frictionally engaged to the clutch surface and wound such that the coils tend to expand when rotary power is transmitted from the pulley in the predetermined rotational direction to increase engagement and to cause a rotation of the hub*;

[c) sliding a driver sleeve onto the hub over the wrap spring to form a subassembly comprising the hub, the wrap spring and the driver sleeve, wherein the driver sleeve includes a clutch surface, a driver member and an anti-ramp member the clutch surface being engaged to coils of the wrap spring;]

d) providing a pulley;

e) drivingly coupling a helical torsion spring [into] *to* the pulley;

f) inserting the subassembly into the pulley after step e); and g) rotating one of the pulley and the hub in a selected rotational sense relative to the other one of the pulley and the hub until the driver member on the driver sleeve is engaged with a [second] helical end of the torsion spring [and a driver wall on the pulley is engaged with the first helical end of the torsion spring].

14. A method as claimed in claim 13, wherein step g) is carried out until a selected torque is sensed between the pulley and the hub.

15. A method as claimed in claim 13, wherein the driver member on the driver sleeve is resiliently bendable out of the way by the torsion spring if the driver member does not engage the second helical end of the torsion spring when the subassembly is inserted into the pulley, wherein step g) causes relative rotation between the driver sleeve and the torsion spring until the driver member resiliently returns to a driving position wherein the driver member engages the second helical end of the torsion spring.

16. A method as claimed in claim 15, wherein step c) entails sliding the driver sleeve into a seat, wherein the driver sleeve includes an anti-ramp member that is positionable in an anti-ramp slot that has a fixed angular relationship with the driver wall, wherein the anti-ramp member is resiliently bendable out of the way by the seat if the driver member is not in the anti-ramp slot when the driver sleeve is slid into the seat, wherein step g) causes relative rotation between the driver sleeve and the seat until the anti-ramp member resiliently returns to an active position in which the anti-ramp member extends into the anti-ramp slot.

17. A decoupler assembly comprising:

a hub that defines a slot;

a driver sleeve having a flange portion and a clutch surface, the flange portion having a driver member;

a wrap spring disposed about the hub and radially within the driver sleeve, the wrap spring having a first end, a plurality of coils, and a second end, the first end being received in the slot, the plurality of coils being frictionally engaged to with the clutch surface;

a pulley having a driver wall at one axial end of the pulley;

a helical torsion spring disposed radially between the pulley and the driver sleeve, the helical torsion spring having a first helical end and a second helical end, the first helical end being abutted against the driver wall, the second helical end being abutted against the driver member; and at least one bearing element supporting the pulley for rotation on the hub wherein one of an anti-ramp slot or an anti-ramp member is provided at another axial end of the pulley in a fixed angular relationship with the driver wall, wherein the anti-ramp slot has a first end and a second end, wherein the driver sleeve includes the other of the anti-ramp member and the anti-ramp slot, wherein the anti-ramp member is resiliently biased towards an extended position and is movable to a retracted position when not exposed to the anti-ramp slot and is movable via rotation of the driver sleeve to a position to be exposed to the anti-ramp slot.

*18. The decoupler assembly of claim 17, comprising a second bearing element operatively connected to the pulley having a tab connected in series with the torsion spring and the driver sleeve to impart rotatory power from the pulley to the torsion spring.*

*19. A decoupler assembly comprising:*

*a hub;*

*a driver sleeve mounted about the hub, the driver sleeve having a radially inner surface defining a clutch surface;*

*a pulley having an inner surface and an outer surface, the outer surface of the pulley is configured to engage an endless drive element;*

*a torsion spring positioned between the inner surface of the pulley and a radially outer surface of the driver sleeve, the torsion spring configured to transmit rotary power in a predetermined rotational direction from the pulley to the driver sleeve; and*

*a wrap spring disposed in a chamber partly defined by the clutch surface of the driver sleeve and the hub, the wrap spring having a first end, a second end and a plurality of coils between the first and second ends, at least a portion of the coils being frictionally engaged to the clutch surface and wound such that the coils tend to expand when rotary power is transmitted from the pulley to the driver sleeve such that rotation of the wrap spring causes corresponding rotation of the hub.*

*20. A decoupler assembly comprising:*

*a pulley having an outer surface and an inner surface;*

*a hub extending within the pulley;*

*a driver sleeve having a flange portion and a clutch surface, the flange portion having a driver member;*

*a wrap spring disposed about the hub and positioned within a chamber that is at least partly defined by the clutch surface of the driver sleeve and the hub, the wrap spring having a first end, a plurality of coils, and a second end, the plurality of coils being frictionally engaged with the clutch surface, the wrap spring being wound such that the coils tend to expand when the driver sleeve is rotated in a predetermined rotational direction to cause a rotation of the wrap spring, the wrap spring coupled to the hub such that a rotation of the wrap spring causes a corresponding rotation of the hub;*

*an end cap disposed in one axial end of the pulley and having tab extending therefrom;*

*a helical torsion spring disposed radially between the pulley and the driver sleeve, the helical torsion spring having a first helical end and a second helical end, the first helical end abutting the tab, the second helical end abutting the driver member to transmit rotary power in the predetermined rotational direction from the pulley to the driver sleeve.*

*21. A decoupler assembly comprising:*

*a hub;*

*a driver sleeve mounted about the hub, the driver sleeve defining a clutch surface;*

*a pulley that is configured to engage an endless drive element;*

*a torsion spring received between the pulley and the driver sleeve and configured to transmit rotary power in a predetermined rotational direction from the pulley to the driver sleeve; and*

*a wrap spring having a first end, a second end and a plurality of coils between the first and second ends, the coils being frictionally engaged to the clutch surface and wound such that the coils tend to expand when rotary power is transmitted from the pulley to the hub in the predetermined rotational direction.*

* * * * *